United States Patent [19]

Kamada

[11] Patent Number: 4,563,761
[45] Date of Patent: Jan. 7, 1986

[54] RESONATOR ASSEMBLY HAVING DIRECT CURRENT COMPONENT BYPASS MEANS FOR USE IN A VIDEO DISK PLAYER

[75] Inventor: Shuhei Kamada, Mino, Japan

[73] Assignee: Sanyo Electric Co., Ltd., Osaka, Japan

[21] Appl. No.: 409,531

[22] Filed: Aug. 19, 1982

[30] Foreign Application Priority Data

Aug. 19, 1981 [JP]  Japan ................. 56-129822

[51] Int. Cl.$^4$ .............................................. G11B 9/06
[52] U.S. Cl. ..................................... 369/126; 369/129
[58] Field of Search ............... 369/126, 129, 151, 150; 358/342

[56] References Cited

U.S. PATENT DOCUMENTS

| 4,080,625 | 3/1978 | Kawamoto et al. | 369/129 |
| 4,152,641 | 5/1979 | Hughes et al. | 369/126 |
| 4,320,491 | 3/1982 | Rustman | 369/126 |
| 4,459,691 | 7/1984 | Yamada | 369/126 |

FOREIGN PATENT DOCUMENTS 53-124018  10/1978  Japan ..................................... 358/342

Primary Examiner—Robert L. Richardson
Attorney, Agent, or Firm—Armstrong, Nikaido, Marmelstein & Kubovcik

[57] ABSTRACT

An improved resonator assembly employed in a capacitive pick-up assembly for use in a video disc system includes an oscillator and a resonator. The improved resonator comprises an electrode provided on a stylus for reading information carried on a disc as a track of the disc relatively moves past the stylus, a tuned line having a first end accommodated in a resonator cavity and a second end connected to the stylus electrode, a capacitive element connected between the first end of the tuned line and an inner face of the resonator cavity, and a bypass circuit connected between the tuned line and inner face of the resonator cavity. The bypass circuit has a high impedance with respect to a high frequency signal produced from the oscillator, whereby the bypass circuit cuts current flow of high a.c. component, but allows current flow of d.c. component.

9 Claims, 5 Drawing Figures

RESONATOR ASSEMBLY HAVING DIRECT CURRENT COMPONENT BYPASS MEANS FOR USE IN A VIDEO DISK PLAYER

BACKGROUND OF THE INVENTION

1. Field of the invention

The present invention relates to a video disc system utilizing the CED or VHD capacitive pick-up system and, more particularly, to a pick-up resonator assembly for the readout of information carried in the video disc.

2. Description of the Prior Art

Generally, a resonator assembly 1 used in the CED capacitive pick-up system, as shown in FIG. 1, includes an oscillator 2 for producing, e.g., a 915 MHz sinusoidal wave signal, a resonator 3 with the resonant frequency of, e.g., 910 MHz for changing the operating point of the 915 MHz oscillator energy to 910 MHz, and a detector 7 for detecting the signal carried on 915 MHz signal. As shown in FIG. 1, the resonator 3 is connected through an input terminal 6 and a flylead 5 to an electrode provided on a stylus 4. The stylus electrode is generally formed by the deposition of titanium film or hafnium film on a diamond stylus base through the step of, e.g., sputtering. The stylus 4 is provided for the engagement with a video disc 13 which has a relatively fine spiral groove, defining a track, in which geometric indentations are formed to carry frequency modulated signals of picture and/or sound. During playback, the stylus 4 engages the groove as the disc 13 is rotated by a support turntable (not shown), producing capacitive variations between the stylus electrode 4 and the conductive disc 13. The stylus-disc capacitance is made part of the resonator 3. As the stylus-disc capacitance changes, the frequency of the resonant peak changes, as shown by the curves a, b, and c shown in FIG. 2, causing amplitude modulation of the 915 MHz signal passed through the circuit, as shown by the waveform 14 in FIG. 2. The amplitude-modulated 915 MHz signal is then demodulated by detector 7. Thus, the detector 7 produces from an output terminal 8 a frequency modulated signal that rises and falls in voltage as the surface of the disc 13 rises and falls under the stylus 4.

The output 8 of the resonator assembly 1 is connected to a preamplifier 10 including an amplifier 11 and an automatic frequency tuning (AFT) circuit 12. The amplifier 11 amplifies the frequency modulated signal obtained from the terminal 8. The AFT circuit 12 detects the d.c. component of the frequency modulated signal from the terminal 8, and compares the detected d.c. component with a predetermined d.c. level produced from a reference voltage generator provided in the AFT circuit 12. Then, the AFT circuit 12 produces an AFT voltage signal, which is a signal relative to the difference between the detected d.c. component and the predetermined d.c. level.

It is to be noted that the AFT circuit 12 is provided for correcting the change of resonant frequency due to the change of average capacitance between the stylus 4 and the disc 13 or for correcting the deviation of resonant frequency due to the uneven of the flylead 5 or stylus 4.

Referring to FIG. 3, there is shown a circuit diagram of one example of a resonator assembly 1 according to the prior art. The resonator assembly 1 shown includes a metallic casing 15 which is connected to ground. The metallic casing 15 has a separation wall 15a for separating the casing 15 into two cavities CA1 and CA2.

Accommodated in the left cavity CA1 is the oscillator 2 formed by capacitors C1 to C5, resistors R1 to R4, a transistor Q1 and a transmission line L1. As apparent to those skilled in the art, the oscillator employed is a base grounded Colpitts type. Also accommodated in the left cavity CA1 is a transmission line L2 located closely adjacent to the transmission line L1 for effecting the electromagnetic mutual coupling between the transmission lines L1 and L2.

Accommodated in the right cavity, i.e., resonator cavity CA2 are the resonator 3 formed by capacitors C7 and C8, choke coil L5, varactor diode (variable capacitance diode) D1, and tuned line L4, and the detector 7 formed by capacitors C9 and C10, diodes D2 and D3, and transmission line L6. Also accommodated in the right cavity CA2 is a transmission line L3 which extends through an opening formed in the separation wall 15a to the left cavity CA1 for the electric connection with the transmission line L2 via a capacitor C6. The transmission line L3 and the tuned line L4 are located adjacent to each other to effect the electromagnetic mutual coupling and, similarly, the tuned line L4 and the transmission line L6 are located adjacent to each other to effect the electromagnetic mutual coupling.

One end of the tuned line L4 extends outwardly from the cavity CA2 through an opening formed in the casing 15, and is connected with the terminal 6 which is in turn connected to the stylus electrode 4. Since the capacitance between the stylus electrode 4 and the disc 13 varies in a manner described above, the stylus electrode 4 and the disc 13 are shown by the symbol of a variable capacitor. The disc 13 is connected to ground.

The other end of the tuned line 14 is located inside the cavity CA2 and is connected with the casing 15 through capacitor C7 and varactor diode D1.

The prior art resonator assembly is disclosed, e.g., in a document "RCA SelectaVision VideoDisc SFT100 Player Technical Manual" first edition 8048 V5 distributed to public in 1980, in Chapter four under a title "Video Disc Signal Retrieval".

Here, it is to be noted that the AFT voltage signal from the AFT circuit 12 is applied through the terminal 9, choke coil L5 to a junction 16 between the capacitor C7 and the varactor diode D1. Accordingly, the AFT voltage modulates the effective length of the tuned line L4.

It is also to be noted that according to the prior art resonator assembly described above, the capacitor C7 cuts d.c. component from the junction 16 and, at the same time, the capacitor defined by the stylus electrode 4 and the disc 13 also cuts d.c. component from the ground. Accordingly the tuned line L4 and the stylus electrode 4 are, from the view point of d.c. current, disconnected from any part of the circuit, even from the ground.

In operation, the disc 13 is first placed on the turntable and, then, a pickup arm carrying the stylus 4 is so moved as to effect the engagement between the stylus 4 and the grooves in the disc 3. During the movement of the pickup arm, the distance between the stylus 4 and the disc 13 becomes very small, causing a sudden increase of capacitance therebetween. The increase of capacitance between the stylus 4 and the disc 13 results in the shift of resonance frequency from 910 MHz to a lower frequency, e.g., shown by a broken curve a in FIG. 2. Accordingly, the AFT circuit 12 produces a AFT voltage signal to the terminal 9, resulting in the increase of voltage level at the junction 16. Thus, the voltage level along the tuned line L4 and that at the stylus electrode 4 increases relatively. Since the disc 13 is held to the ground level, there is a potential difference produced between the stylus electrode 4 and the disc 13.

In addition to above, the potential difference between the disc 13 and the stylus electrode 4 is produced by the electrostatic charge given to the stylus electrode 4 when the stylus electrode 4 is held closely adjacent to the disc 13 rotating at a high speed.

Such a potential difference results in spark discharge which gives rise to a damage to the stylus electrode 4 or to the surface of the disc 13.

SUMMARY OF THE INVENTION

The present invention has been developed with a view to substantially solving the above described drawback and has for its essential object to provide an improved pickup resonator assembly which will not produce any potential difference between the stylus electrode and the disc so as to prevent any spark discharge therebetween.

It is also an essential object of the present invention to provide an improved pickup resonator assembly of the above described type which is simple in construction.

In accomplishing these and other objects, an improved resonator assembly, according to the present invention, comprises an electrode provided on a stylus for reading information carried on a disc as a track of the disc relatively moves past the stylus, a tuned line having a first end accommodated in a resonator cavity and a second end connected to the stylus electrode, a capacitive element connected between the first end of the tuned line and an inner face of the resonator cavity, and a bypass circuit connected between the tuned line and inner face of the resonator cavity. The bypass circuit has a high impedance with respect to a high frequency signal produced from the oscillator, whereby the bypass circuit cuts current flow of high a.c. component, but allows current flow of d.c. component.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DESCRIPTION OF THE PREFERRED EMBODIMENTS

Figure 1:
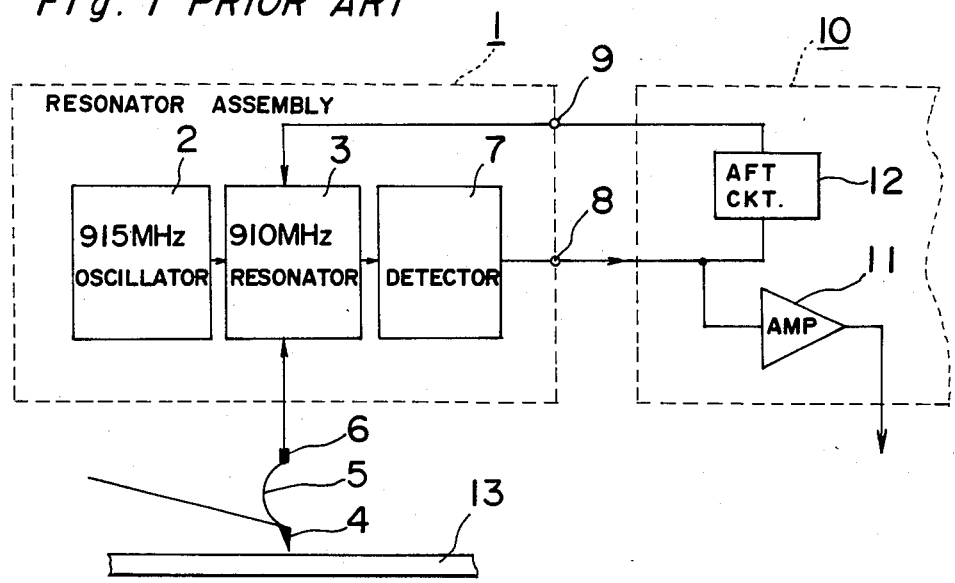
FIG. 1 is a block diagram showing a fundamental arrangement in general of the resonator assembly and its associated parts.
Figure 3:
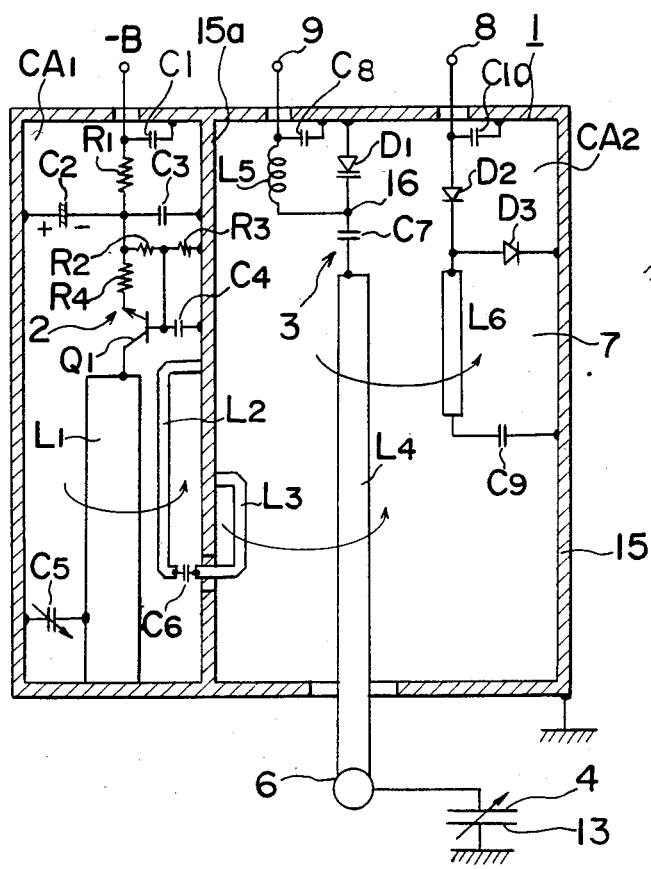
FIG. 3 is a circuit diagram of the resonator assembly according to the prior art.
Figure 2:
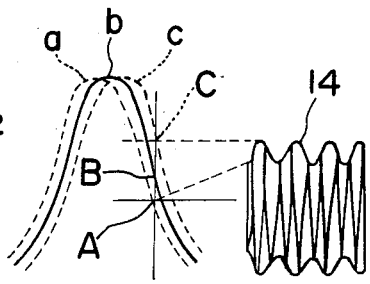
FIG. 2 is a graph showing response curve of tuned line and FM video signal carried on 915 MHz signal.
Figure 4:
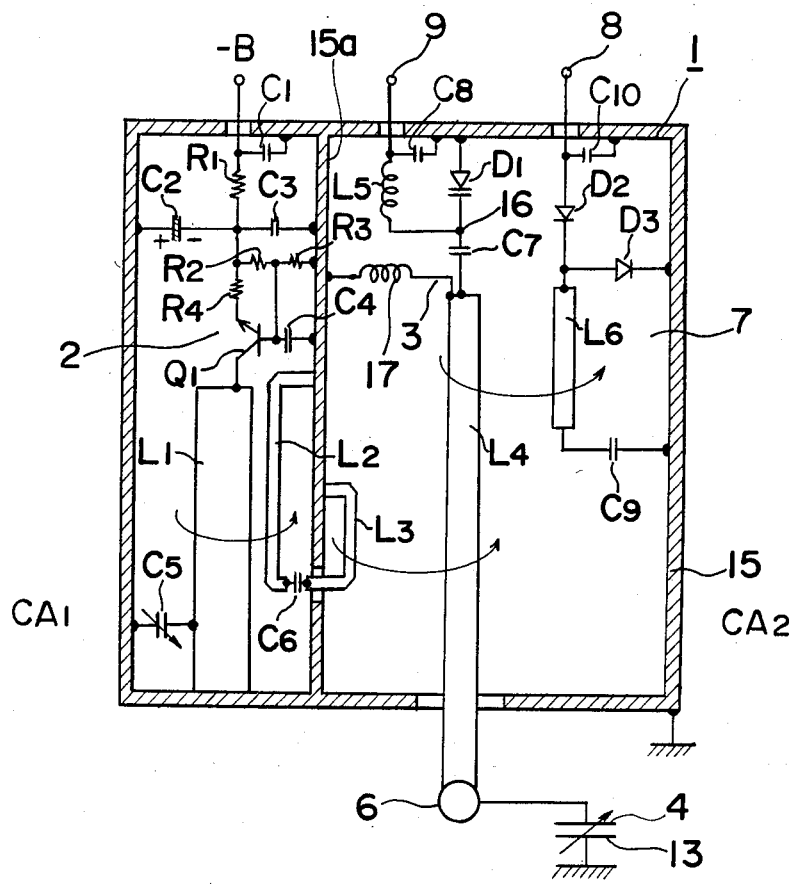
FIG. 4 is a circuit diagram of a resonator assembly according to one embodiment of the present invention.

Referring to FIG. 4, a resonator assembly according to the first preferred embodiment of the present invention has exactly the same circuit arrangement as that described above in connection with FIG. 3 and, therefore, the detailed description therefor is omitted for the sake of brevity. In addition, the resonator assembly of the first preferred embodiment shown in FIG. 4 has a bypass circuit 17 formed by a choke coil having several microhenries. One end of the bypass circuit 17 is connected to the end of the tuned line L4 remote from the input terminal 6, and the other end of the bypass circuit 17 is connected to the separation wall 15a at a portion where the separation wall 15a is located closest to said end of the tuned line L4 connected with the bypass circuit 17. Accordingly, the bypass circuit 17 bridges across the tuned line L4 and the separation wall 15a where the voltage level of a high frequency signal appearing along the tuned line L4 is lowest. Accordingly, from the view point of d.c. component, the tuned line L4 is grounded through the bypass circuit 17 and the casing 15. Contrary, from the view point of a.c. component, since the choke coil 17 has sevral microhenries and thus its impedance is very high with respect to the oscillating signal from the oscillator 2, the wanted a.c. signal appearing along the tuned line L4 will not be fed to ground through the bypass circuit 17.

In operation, when the stylus 4 moves towards the rotating disc 13, the voltage level at the junction 16 increases by the AFT voltage signal in a manner described above, or the electrostatic charge appears at the stylus electrode 4, and such an increase of the voltage level or electrostatic charge gives rise to the potential difference between the stylus electrode 4 and the disc 13. However, according to the present invention, since the tuned line L4 is grounded from the view point of d.c. component, such an increase of voltage level of the tuned line L4 caused by the AFT voltage signal or electrostatic charge is discharged through the bypass circuit 17. Therefore, the tuned line L4 is maintained to the ground level and, thus, there will be no potential difference produced between the stylus electrode 4 and the disc 13. Thus, no spark discharge occurs between the stylus electrode 4 and the disc 13.

Figure 5:
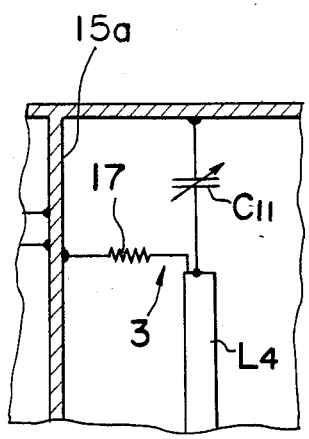
FIG. 5 is a partial circuit diagram of a resonator assembly according to another embodiment of the present invention.

According to another preferred embodiment of the present invention, the bypass circuit 17, which has been described as formed by a choke coil, is formed by a resistor 17, as shown in FIG. 5. The resistance of the resistor 17 is preferably very high, such as several hundreds kiloohms to several megohms.

It is to be noted that the resonator assembly according to the present invention can be employed in a circuit without the AFT circuit 12. In this case, as shown in FIG. 5, the resonator 3 is formed by the tuned line L4, the bypass circuit 17, and a variable capacitor C11 connected between the end of the tune line L4, which is connected to the bypass circuit 17, and the inner wall of the cavity CA2.

As apparent from the foregoings, the employment of the bypass circuit 17 eliminates the undesirable spark discharge between the stylus electrode 4 and the disc 13, and, therefore, the employment of the bypass circuit 17 prevents the stylus electrode or disc surface from being damaged by such a spark discharge. Thus, the life time of the stylus, as well as that of the disc can be prolonged.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of appended claims.

What is claimed is:

1. In a resonator assembly employed in a capacitive pick-up assembly for use in a video disc system, said resonator assembly including an oscillator and a resonator, the improvement wherein said resonator comprises:

an electrode provided on a stylus for reading information carried on a disc as a track of the disc moves relatively past said stylus;

a tuned line having a first end accommodated in a resonator cavity and a second end connected to said stylus electrode;

a capacitive element connected between said first end of the tuned line and an inner face of said resonator cavity; and a bypass circuit connected between said tuned line and said inner face of said resonator cavity, said bypass circuit having a high impedance with respect to a high frequency signal produced from said oscillator, whereby said bypass circuit impedes current flow of high frequency alternating current component corresponding to an output signal of said oscillator modulated in accordance with said information carried on said disc read by said electrode while permitting current flow of only direct current component, whereby electrostatic discharge between said stylus and said disc is prevented.

2. A resonator assembly as claimed in claim 1, wherein said bypass circuit has first and second ends, said first end of the bypass circuit being connected to said first end of the tuned line, and said second end of the bypass circuit being connected to a portion of said inner face of said resonator cavity which is located closest to said first end of said tuned line.

3. A resonator assembly as claimed in claim 1, wherein said bypass circuit comprises a choke coil.

4. A resonator assembly as claimed in claim 1, wherein said bypass circuit comprises a resistor acting in cooperation with said capacitive element.

5. In a resonator assembly employed in a capacitive pick-up assembly for use in a video disc system, said resonator assembly including an oscillator and a resonator, the improvement wherein said resonator comprises:

an electrode provided on a stylus for reading information carried on a disc as a track of the disc moves relatively past said stylus;

a tuned line having a first end accommodated in a resonator cavity and a second end connected to said stylus electrode;

a variable capacitance diode connected between said first end of the tuned line and an inner face of said resonator cavity, said diode being supplied with an AFT voltage signal for correcting a change of resonant frequency of said resonator; and a resistor connected between said tuned line and said inner face of said resonator cavity, said resistor, acting in cooperation with said variable capacitance diode, having a high impedance with respect to a high frequency signal produced from said oscillator, whereby current flow of high frequency alternating current component through said resistor is impeded while current flow of direct current component over a short period of time through said resistor is allowed so as to prevent said electrode from producing a discharge current with respect to said disc upon increasing of voltage in said tuned line.

6. An improved resonator assembly in accordance with claim 1, further comprising means for making the respective voltage levels at said stylus electrode and said disc equal.

7. An improved resonator assembly in accordance with claim 5, further comprising means for making the respective voltage levels at said stylus electrode and said disc equal.

8. An improved resonator assembly in accordance with claim 1, wherein said stylus electrode and said disc are each connected to ground with respect to direct current voltages.

9. An improved resonator assembly in accordance with claim 5, wherein said stylus electrode and said disc are each connected to ground with respect to direct current voltages.

* * * * *